US012682641B2

(12) United States Patent
Gurukar et al.

(10) Patent No.: US 12,682,641 B2
(45) Date of Patent: Jul. 14, 2026

(54) END-TO-END MULTITASK VIDEO RETRIEVAL WITH CROSS-ATTENTION

(71) Applicant: Samsung Electronics Co., Ltd., Suwon-si (KR)

(72) Inventors: Saket Gurukar, Mountain View, CA (US); Du Tran, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 18/410,363

(22) Filed: Jan. 11, 2024

(65) Prior Publication Data

US 2025/0139971 A1 May 1, 2025

Related U.S. Application Data

(60) Provisional application No. 63/546,890, filed on Nov. 1, 2023.

(51) Int. Cl.
*G06V 20/40* (2022.01)

(52) U.S. Cl.
CPC .............. *G06V 20/49* (2022.01); *G06V 20/46* (2022.01)

(58) Field of Classification Search
CPC ................................ G06V 20/49; G06V 20/46
See application file for complete search history.

(56) References Cited

U.S. PATENT DOCUMENTS

| | | | |
|---|---|---|---|
| 9,729,834 B2 | 8/2017 | Desimone et al. | |
| 10,803,127 B2 | 10/2020 | Alexander et al. | |
| 10,896,342 B2 | 1/2021 | Gavrilyuk et al. | |
| 11,698,926 B2 | 7/2023 | Mondal et al. | |
| 2017/0357720 A1 | 12/2017 | Torabi et al. | |
| 2019/0102276 A1* | 4/2019 | Dang | G06F 18/24155 |
| 2021/0248375 A1 | 8/2021 | Geng et al. | |
| 2022/0122357 A1 | 4/2022 | Zhao et al. | |
| 2022/0277015 A1 | 9/2022 | Zhang et al. | |
| 2022/0301310 A1 | 9/2022 | Kim et al. | |
| 2023/0113643 A1* | 4/2023 | Mittal | G06F 16/75 382/159 |
| 2024/0127597 A1* | 4/2024 | Singh | G06V 10/7715 |

FOREIGN PATENT DOCUMENTS

CN          113128431 B          8/2022

OTHER PUBLICATIONS

Yang et al., "Relational Space-Time Query in Long-Form Videos," 2023 IEEE/CVF Conference on Computer Vision and Pattern Recognition (CVPR), Jun. 2023, 11 pages.

(Continued)

*Primary Examiner* — Mishawn N. Hunter

(57) ABSTRACT

A method includes obtaining a video and a relational space-time query and identifying at least one type of the relational space-time query. The at least one identified type of the relational space-time query represents at least one of: an activity type, an object type, or a time type. The method also includes learning correlations among activities, objects, and time in the video using, one or more cross-attention models. The method further includes obtaining one or more predictions generated using one or more outputs of the one or more cross-attention models based on the at least one identified type of the relational space-time query. In addition, the method includes generating a response to the relational space-time query based on the one or more predictions.

14 Claims, 4 Drawing Sheets

(56) References Cited

OTHER PUBLICATIONS

Vaswani et al., "Attention Is All You Need," NIPS'17: Proceedings of the 31st International Conference on Neural Information Processing Systems, Dec. 2017, 15 pages.
International Search Report and Written Opinion of the International Searching Authority dated Feb. 19, 2025 in connection with International Patent Application No. PCT/KR2024/016556, 7 pages.

* cited by examiner

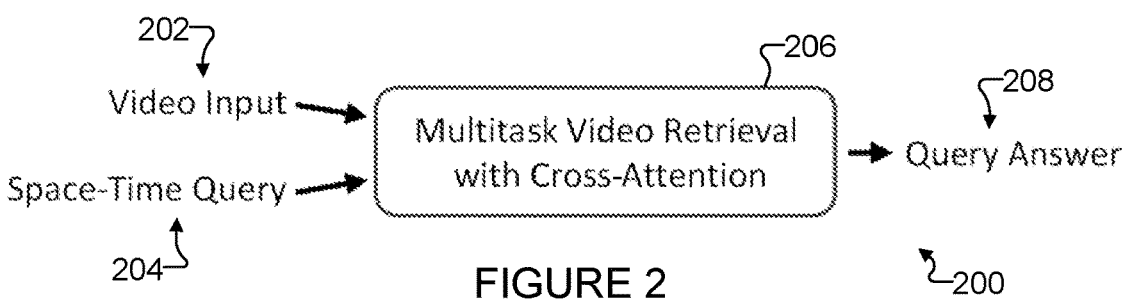
202
Video Input →
206
Multitask Video Retrieval with Cross-Attention
→ Query Answer
208
Space-Time Query →
204
FIGURE 2
200
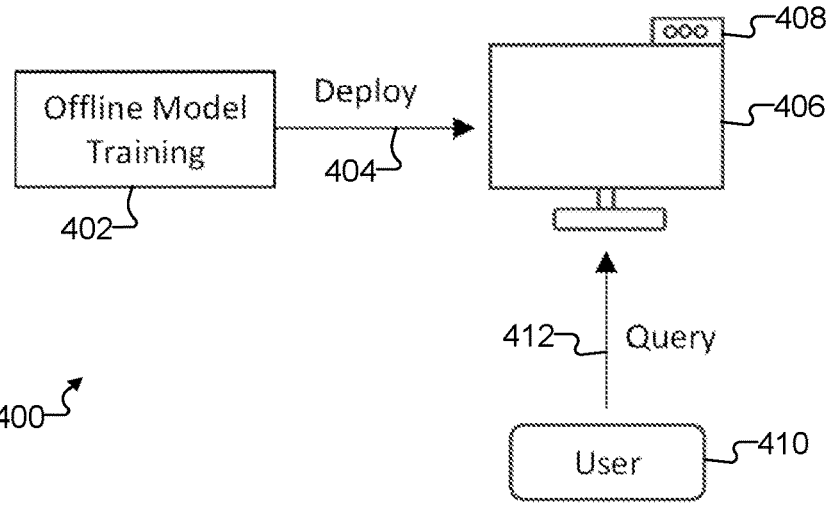
Offline Model Training
402
Deploy
404
408
406
412 Query
User
410
400
FIGURE 4
502
Deploy →
Cloud Instance
412
Query
406
506 Query Answer
Retrieve Video Content
504
Recorded Content
500
412 Query
410 User
FIGURE 5

END-TO-END MULTITASK VIDEO RETRIEVAL WITH CROSS-ATTENTION

CROSS-REFERENCE IO RELATED APPLICATION AND PRIORITY CLAIM

This application claims priority under 35 U.S.C. § 119(e) to U.S. Provisional Patent Application No. 63/546,890 filed on Nov. 1, 2023, which is hereby incorporated by reference in its entirety.

TECHNICAL FIELD

This disclosure relates generally to video processing systems and methods. More specifically, this disclosure relates to end-to-end multitask video retrieval with cross-attention.

BACKGROUND

The abundance of video recording devices in today's society has resulted in huge numbers of videos being captured, many of which are uploaded to the Internet for viewing. These video recording devices include mobile smartphones, smart cameras, moving cameras in robots, and virtual reality/augmented reality/mixed reality glasses or assistants. Unfortunately, these devices often capture long, unstructured, and uninterrupted videos, which makes it difficult for users to identify specific video sequences that might satisfy user queries.

SUMMARY

This disclosure relates to end-to-end multitask video retrieval with cross-attention.

In a first embodiment, a method includes obtaining a video and a relational space-time query and identifying at least one type of the relational space-time query. The at least one identified type of the relational space-time query represents at least one of: an activity type, an object type, or a time type. The method also includes learning correlations among activities, objects, and time in the video using one or more cross-attention models. The method further includes obtaining one or more predictions generated using one or more outputs of the one or more cross-attention models based on the at least one identified type of the relational space-time query. In addition, the method includes generating a response to the relational space-time query based on the one or more predictions.

In a second embodiment, an electronic device includes at least one processing device configured to obtain a video and a relational space-time query and identify at least one type of the relational space-time query. The at least one identified type of the relational space-time query represents at least one of: an activity type, an object type, or a time type. The at least one processing device is also configured to learn correlations among activities, objects, and time in the video using one or more cross-attention models. The at least one processing device is further configured to obtain one or more predictions generated using one or more outputs of the one or more cross-attention models based on the at least one identified type of the relational space-time query. In addition, the at least one processing device is configured to generate a response to the relational space-time query based on the one or more predictions.

In a third embodiment, a non-transitory machine readable medium contains instructions that when executed cause at least one processor of an electronic device to obtain a video and a relational space-time query and identify at least one type of the relational space-time query. The at least one identified type of the relational space-time query represents at least one of: an activity type, an object type, or a time type. The non-transitory machine readable medium also contains instructions that when executed cause the at least one processor to learn correlations among activities, objects, and time in the video using one or more cross-attention models. The non-transitory machine readable medium further contains instructions that when executed cause the at least one processor to obtain one or more predictions generated using one or more outputs of the one or more cross-attention models based on the at least one identified type of the relational space-time query. In addition, the non-transitory machine readable medium contains instructions that when executed cause the at least one processor to generate a response to the relational space-time query based on the one or more predictions.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "emergent," "member," "apparatus," "machine," "system," "processor," or "controller," within a claim is understood by the Applicant to refer to structures known to those skilled in the relevant art and is not intended to invoke 35 U.S.C. § 112(ft).

BRIEF DESCRIPTION OF THE DRAWINGS

For a more complete understanding of this disclosure and its advantages, reference is now made to the following description, taken in conjunction with the accompanying drawings, in which:

FIGS. 2 and 3 illustrate example architectures supporting end-to-end multitask video retrieval with cross-attention in accordance with this disclosure;

FIGS. 4 and 5 illustrate specific examples of use cases for end-to-end multitask video retrieval with cross-attention in accordance with this disclosure.

DETAILED DESCRIPTION

Figure 1:
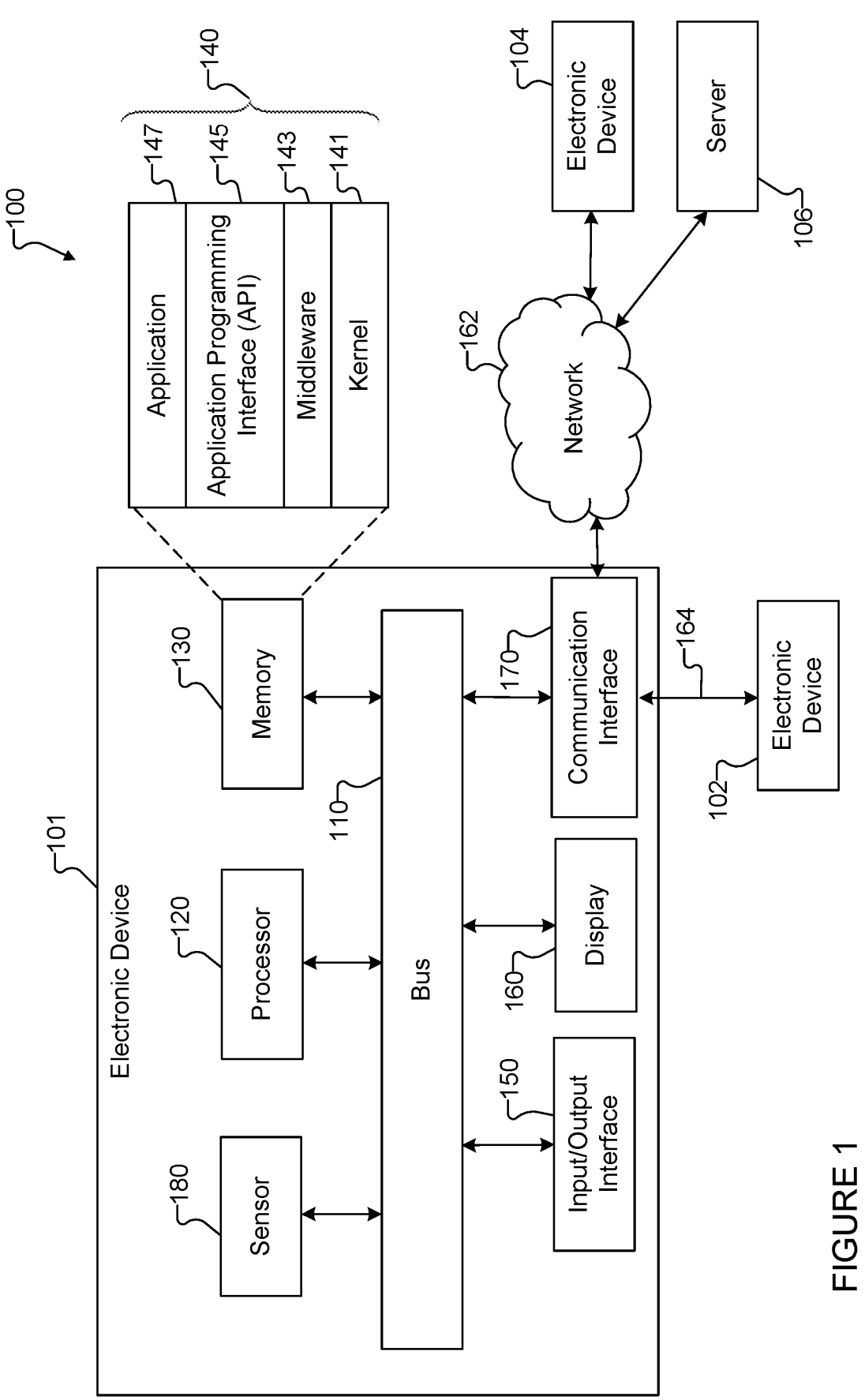
FIG. 1 illustrates an example network configuration including an electronic device in accordance with this disclosure.

FIGS. 1 through 6, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, the abundance of video recording devices in today's society has resulted in huge numbers of videos being captured, many of which are uploaded to the Internet for viewing. These video recording devices include mobile smartphones, smart cameras, moving cameras in robots, and virtual reality/augmented reality/mixed reality glasses or assistants. Unfortunately, these devices often capture long, unstructured, and uninterrupted videos, which makes it difficult for users to identify specific video sequences that might satisfy user queries.

Video querying systems often involve identifying and processing specific videos or portions of specific videos in order to answer user queries involving the videos. For example, given a video, a user might be interested in obtaining responses to the following queries. The user may wish to know what activity or activities a recorded person performed while using a specified object over a specified time period during the video, which is known as an "activity query." The user may wish to know which object or objects the recorded person interacted with while performing a specified activity over a specified time period during the video, which is known as an "object query." The user may wish to know when the recorded person performed a specified activity with a specified object during the video, which is known as a "time query." The activity, object, and time queries are collectively referred to here as "relational space-time queries." Note that the recorded person in the video may or may not represent the user who is submitting the relational space-time query.

The ability to accurately answer relational space-time queries may be useful in a large number of practical applications, such as visual assistants, smart home applications, and home-buddy robots. However, video querying is often a challenging task, and prior approaches typically attempt to answer different types of relational queries independently, which means that these prior approaches may be used to answer a single type of query (activity, object, or time) but not multiple types of queries. One reason for this has been due to the lack of training datasets that annotate activities, objects, and time of interaction in training videos. Moreover, even if suitable training datasets could be obtained, it is difficult for machine learning models to learn various inter-relationships between activities, objects, and time of interaction. In addition, the lengths of videos that can be processed by the machine learning models is generally limited (such as to about three minutes or less) due to memory and other computational constraints.

Even assuming these difficulties can be overcome, training a machine learning model jointly on different types of relational space-time queries (activity, object, and time) is challenging and is not straightforward. For example, one challenge can involve designing a machine learning architecture that can answer different types of relational space-time queries together. That is, it is difficult to train the same machine learning model to answer all relational space-time queries regardless of their types. Answering relational space-time queries may require the machine learning model to understand the inter-relationships between activities, objects, and times during which activities are performed using objects. Moreover, end-to-end training of a machine learning model to perform these tasks jointly in order to obtain higher recall or accuracy can involve a specially-designed training schedule or curriculum. In addition, it is not clear how to extend machine learning training techniques for use with videos of relatively long lengths.

This disclosure provides various techniques for end-to-end multitask video retrieval with cross-attention. As described in more detail below, a video and a relational space-time query are obtained. In some cases, the video may represent a relatively-long video, such as a video having a length of about thirty minutes or more (although shorter lengths are also possible). At least one type of the relational space-time query is identified, where the at least one identified type of the relational space-time query represents an activity type, an object type, and/or a time type. In other words, the specific type(s) of the obtained relational space-time query can be identified. Correlations among activities, objects, and time in the video are learned using one or more machine learning models, such as one or more cross-attention models. This may include generating embeddings of at least some image frames in the video and embeddings of the activity and/or object identified by the relational space-time query and identifying tokens based on the embeddings. Activity cross-attention, object cross-attention, and/or time cross-attention can be performed based on the tokens, and results of the cross-attention(s) can be processed to generate an activity prediction, an object prediction, and/or a time prediction. One or more predictions generated using one or more outputs of the one or more cross-attention models are obtained based on the at least one identified type of the relational space-time query, and a response to the relational space-time query is generated based on the one or more predictions. If needed or desired (such as for a lengthy video), the video can be split into multiple segments, and one or more predictions can be generated for each of the multiple segments and aggregated. Also, in some cases, the one or more cross-attention models may be trained using training videos having one or more frame rates lower than the frame rate(s) of the videos to be processed during inferencing.

In this way, the described techniques provide a novel end-to-end machine learning model architecture that uses cross-attention to understand the inter-relationships between activities, objects, and time in videos in order to facilitate generation of query answers to relational space-time queries, regardless of the specific types of relational space-time queries being processed. Moreover, because the machine learning model(s) can be trained to jointly understand activities, objects, and time and the inter-relationships between activities, objects, and time, the described techniques can be more effective at answering relational space-time queries. Further, in some cases, a single machine learning model may be used to answer all relational space-time queries, which can provide efficiencies in run-time, memory, and storage. In addition, the described techniques can be used with videos of various lengths, including those of up to thirty minutes in length or more.

Note that the various embodiments discussed below can be used in any suitable devices and in any suitable systems. Example devices in which the various embodiments discussed below may be used include various consumer electronic devices, such as smartphones, tablet or other computers, and televisions. However, it will be understood that the principles of this disclosure may be implemented in any number of other suitable contexts.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180, In some embodiments, the electronic device 101 may exclude at least one of these components or may add at least one other component. The bus 110 includes a circuit for connecting the components 120-180 with one another and for transferring communications (such as control messages and/or data) between components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), a graphics processor unit (GPU), or a neural processing unit (NPU). The processor 120 is able to perform control on at least one of the other components of the electronic device 101 and/or perform an operation or data processing relating to communication or other functions. As described below, the processor 120 may perform various functions related to end-to-end multitask video retrieval with cross-attention.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for end-to-end multitask video retrieval with cross-attention. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)) Internet, or a telephone network.

The electronic device 101 may further include one or more sensors 180 that can meter a physical quantity or detect an activation state of the electronic device 101 and convert metered or detected information into an electrical signal. For example, one or more sensors 180 can include one or more cameras or other imaging sensors, which may be used to capture images or videos of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that includes one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may perform various functions related to end-to-end multitask video retrieval with cross-attention.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 3:
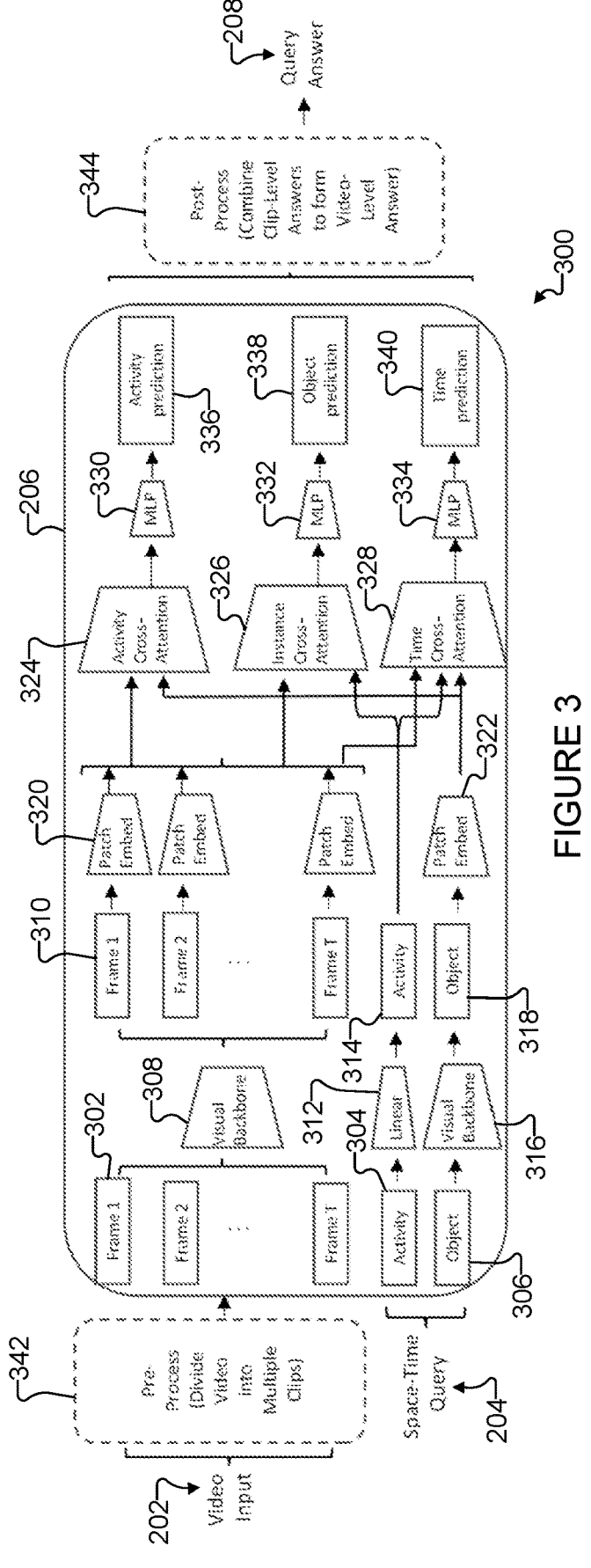

FIGS. 2 and 3 illustrate example architectures supporting end-to-end multitask video retrieval with cross-attention in accordance with this disclosure. More specifically. FIG. 2 provides an example overview of an architecture 200 supporting end-to-end multitask video retrieval with cross-attention, and FIG. 3 provides a more specific architecture 300 supporting end-to-end multitask video retrieval with cross-attention. For ease of explanation, the architectures 200 and 300 shown in FIGS. 2 and 3 are described as being implemented on or supported by the electronic device 101 in the network configuration 100 of FIG. 1. However, the architectures 200 and 300 shown in FIGS. 2 and 3 could be used with any other suitable device(s) and in any other suitable system(s), such as when the architectures 200 and 300 are implemented on or supported by the server 106.

As shown in FIG. 2, the architecture 200 generally receives and processes video inputs 202 and relational space-time queries 204. Each video input 202 represents a sequence of images (with or without associated audio data) that can be analyzed in order to determine how to respond to at least one relational space-time query 204. Each video input 202 may be obtained from any suitable source, such as from one or more imaging sensors 180 of the electronic device 101 or from an external source (like an external camera, server, or other device accessible via the Internet or other network), and in any suitable manner. In general, this disclosure is not limited to any specific type(s) or source(s) of video inputs 202.

Each relational space-time query 204 represents a query related to at least one activity, at least one object, and at least one time of a video input 202. In some cases, each relational space-time query 204 can be associated with three aspects (activity, object, and time) and may ask about one aspect while providing the other two aspects as input. The examples of the activity, object, and time queries provided above illustrate this, such as when the activity query identifies an object and a time period and the activity query inquires about the activity. Note that the at least one time for a relational space-time query 204 may be associated with the entire length of a video input 202 or a portion of the length of the video input 202. In other cases, a specific relational space-time query 204 may ask about all three aspects. For example, this type of relational space-time query 204 may include queries such as whether a recorded person performed a specified activity with a specified object over a specified period in a video input 202. This type of query may be referred to as an "inverted search" query.

The architecture 200 in FIG. 2 performs a multitask video retrieval with cross-attention operation 206, which processes the video inputs 202 and the related relational space-time queries 204 in order to generate query answers 208 for the relational space-time queries 204. The multitask video retrieval with cross-attention operation 206 here uses one or more machine learning models, such as one or more cross-attention models, to process the video inputs 202 and learn the inter-relationships between the activities and objects captured in the video inputs 202 over time. Once these inter-relationships are learned, the multitask video retrieval with cross-attention Operation 206 can process the relational space-time queries 204 in order to generate the query answers 208. In some cases, the multitask video retrieval with cross-attention operation 206 can divide a video input 202 into segments and process the segments independently, and the multitask video retrieval with cross-attention operation 206 can combine results of processing the different segments into a final result for a query answer 208.

The architecture 300 shown in FIG. 3 illustrates one example of how the multitask video retrieval with cross-attention operation 206 may be implemented. As shown in FIG. 3, the multitask video retrieval with cross-attention operation 206 receives the video inputs 202 and the relational space-time queries 204. Each video input 202 here is associated with a number of image frames 302, and the operation 206 can process these image frames 302 when generating query answers 208 for the relational space-time queries 204. The number of image frames 302 of a video input 202 processed for each relational space-time query 204 can vary depending on the type of relational space-time query 204 being processed. For example, a relational space-time query 204 having the form of an activity query or an object query may include an identification of a specific time period within an associated video input 202 in the relational space-time query 204 itself. In these cases, the operation 206 may identify and process only the image frames 302 falling within that specific time period of the associated video input 202. As another example, a relational space-time query 204 having the form of an activity query or an object query may include an indication (either explicitly or implicitly) in the relational space-time query 204 that the entire time period of the associated video input 202 should be searched, or a relational space-time query 204 having the form of a time query may involve the entire time period of the associated video input 202. In those cases, the operation 206 may identify and process all of the image frames 302 forming the associated video input 202.

Each relational space-time query 204 also typically includes or identifies at least one specific activity 304 and/or at least one specific object 306. For instance, an activity query can identify at least one specific object 306, an object query can identify at least one specific activity 304, and a time query can identify at least one specific activity 304 and at least one specific object 306. Note that an activity 304 and/or an object 306 may be identified in a relational space-time query 204 in any suitable manner. For example, an activity 304 may be identified using text in the relational space-time query 204. Also, the object 306 may be identified using text in the relational space-time query 204 or using an image included in the relational space-time query 204. In some cases, if an object is identified using text in the relational space-time query 204, an image of the object can be obtained and used as the object 306 by the operation 206. The image of the object may be obtained from any suitable source, such as from one or more imaging sensors 180 of the electronic device 101 or from an external source.

Note that the image frames 302, activity 304, and/or object 306 associated with each relational space-time query 204 may be identified in any suitable manner. For example, in some embodiments, the electronic device 101 may include a natural language processing (NLP) engine or other natural language functionality that can process natural language inputs or other inputs in order to identify specific contents of the inputs. Thus, for example, a user of the electronic device 101 may speak, type, or otherwise provide a natural language input to the NLP engine, and the NLP engine can process the natural language input in order to identify at least one time period, at least one activity, and/or at least one object specified by the natural language input. If a time period is identified, the operation 206 can identify the image frames 302 of an associated video input 202 based on that time period. If an activity 304 or object 306 is identified, one or both can be used by the operation 206. In general, this disclosure is not limited to any specific technique(s) for identifying image frames 302, activities 304, and objects 306.

Also note that the image frames 302, activity 304, and/or object 306 identified as input to the operation 206 can vary based on the query type(s) associated with each relational space-time query 204. For example, when the electronic device 101 determines that a relational space-time query 204 identifies a specific time period and a specific object, the query type of the relational space-time query 204 can be identified as an activity type, and no activity 304 may be expected as an input by the operation 206 (since the operation 206 is being used to predict the activity that answers the activity query). When the electronic device 101 determines that a relational space-time query 204 identifies a specific time period and a specific activity, the query type of the relational space-time query 204 can be identified as an object type, and no object 306 may be expected as an input by the operation 206 (since the operation 206 is being used to predict the object that answers the object query). When the electronic device 101 determines that a relational space-time query 204 identifies a specific activity and a specific object, the type of the relational space-time query 204 may be identified as a time type, and all three inputs are received and processed by the operation 206. If a relational space-time query 204 relates to an inverted search, the type of the relational space-time query 204 may be all three (activity, object, and time), and all three inputs are received and processed by the operation 206. When an input to the operation 206 is not expected due to the query type, that input may be masked, such as by providing all zeros or other suitable values to the operation 206.

In this example, the image frames 302 are provided to a visual backbone 308, which processes the image frames 302 in order to generate encoded image frames 310. The encoded image frames 310 represent the contents of the original image frames 302 as projected into a latent space (also known as a feature space or embedding space). The visual backbone 308 here may represent a trained machine learning model or other logic that can identify features of the image frames 302 that are relevant to subsequent tasks performed by the operation 206 and that encodes those features as embeddings in the latent space. Similarly, each identified activity 304 is provided to a linear encoder 312, which generates an encoded activity 314 representing the original activity 304 as projected into a latent space. In addition, each identified object 306 is provided to visual backbone 316, which generates an encoded object 318 representing features of the original object 306 as projected into a latent space. Each visual backbone 308, 316 includes any suitable logic for identifying features of image frames and encoding the identified features, such as a residual neural network or residual network ("ResNet"). The linear encoder 312 includes any suitable logic for encoding text or other information identifying activities, such as one or more linear embedding layers. Note that this example assumes the object 306 is defined using an image, although this is not necessarily required.

The encoded image frames 310 are provided to various patch embedding layers 320, which form sequences of patches for the encoded image frames 310. These patches may be referred to as tokens, and these tokens represent the embeddings of the encoded image frames 310. However, the patches are smaller than the overall image frames 302, so each encoded image frame 310 can be represented using a sequence or collection of multiple tokens. Similarly, the encoded object 318 is provided to a patch embedding layer 322, which forms a sequence of patches or tokens representing the embeddings of the encoded object 318. Again, the encoded object 318 can be represented using a sequence or collection of multiple tokens. In this example implementation, the encoded activity 314 can be represented using one token and may not need to undergo processing by a patch embedding layer. In some embodiments, the tokens representing the encoded image frames 310, the encoded activity 314, and the encoded object 318 can have the same number of dimensions.

For each relational space-time query 204, the operation 206 can generate (i) tokens representing at least some of the image frames 302 in the associated video input 202 and (ii) one or more tokens representing the activity 304 and/or the object 306. Again, this depends on what type of relational space-time query 204 is being processed. If no time period is defined by a relational space-time query 204, tokens can be generated for all image frames 302 in the associated video input 202. If a time period is defined by the relational space-time query 204, tokens can be generated for the image frames 302 falling within that time period. If the relational space-time query 204 identifies an activity 304 but no object 306, at least one token can be generated for the activity 304, and no tokens (or useless tokens) may be generated for the object 306. If the relational space-time query 204 identifies an object 306 but no activity 304, at least one token can be generated for the object 306, and no tokens (or useless tokens) may be generated for the activity 304. If the relational space-time query 204 includes an activity 304 and an object 306, tokens can be generated for the activity 304 and the object 306.

Having formed suitable tokens, the operation 206 proceeds to learn correlations between space-time aspects of the video input 202, which is accomplished using three cross-attention functions 324, 326, 328. Each aspect (activity, object, and time) of a relational space-time query 204 has a unique cross-attention function that operates to assist with the prediction of a value for that aspect given the available tokens. More specifically, the cross-attention function 324 processes the tokens associated with the image frames 302 (associated with time) and the tokens associated with the object 306 in order to learn correlations between one or more types of interactions occurring in the image frames 302 with one or more given objects 306, which allows the cross-attention function 324 to learn what activities are occurring.

The cross-attention function 326 processes the tokens associated with the image frames 302 (associated with time) and the token associated with the activity 304 in order to learn correlations between one or more types of interactions occurring in the image frames 302 and one or more given activities, which allows the cross-attention function 326 to learn what object instances are involved. The cross-attention function 328 processes the token associated with the activity 304 and the tokens associated with the object 306 in order to learn correlations between one or more given activities and one or more given objects, which allows the cross-attention function 328 to learn what times are associated with activities and objects.

Each cross-attention function 324, 326, 328 can be implemented using any suitable machine learning model or other suitable logic. For example, in some embodiments, each cross-attention function 324, 326, 328 can be implemented using a transformer-based attention model. As a particular example, each cross-attention function 324, 326, 328 can be implemented using a transformer-based model described in Vaswani et al., "Attention is All You Need," NIPS'17: Proceedings of the 31st International Conference on Neural Information Processing Systems, December 2017, pages 6000-6010 (which is hereby incorporated by reference in its entirety).

The cross-attention functions 324, 326, 328 can generate and output latent representations of learned associations, such as in the form of latent vectors. These latent representations are provided by the cross-attention functions 324, 326, 328 to multi-layer perceptron (MLP) networks 330, 332, 334, respectively. The MLP networks 330, 332, 334 process the latent representations from the corresponding cross-attention functions and generate predictions 336, 338, 340. For example, the MLP network 330 generates an activity prediction 336, which represents the activity that the operation 206 predicts is occurring at one or more specified times and with one or more specified objects in the associated video input 202. The MLP network 332 generates an object prediction 338, which represents the object that the operation 206 predicts is present at one or more specified times and involved with one or more specified activities in the associated video input 202. The MLP network 334 generates a time prediction 340, which represents the time(s) at which a specified activity may involve a specified object in the associated video input 202.

Each MLP network 330, 332, 334 can be implemented using any suitable machine learning model or other suitable logic. For example, each MLP network 330, 332, 334 may represent a fully-connected multi-layer neural network. As a particular example, each MLP network 330, 332, 334 may include an input layer that receives latent vectors, hidden layers that collectively process the latent vectors using (among other things) nonlinear activation functions, and an output layer that provides the corresponding predictions 336, 338, 340 based on outputs from the final hidden layer.

One or more predictions 336, 338, 340 generated for each relational space-time query 204 can be used to form or otherwise generate the query answer 208 for that relational space-time query 204. When the relational space-time query 204 represents an activity query, the activity prediction 336 can be used to form the query answer 208. For example, if the relational space-time query 204 asks what activity a recorded person performed with a specified object during a specified period within a video input 202, the query answer 208 can include the activity prediction 336. When the relational space-time query 204 represents an object query, the object prediction 338 can be used to form the query answer 208. For instance, if the relational space-time query 204 asks which object the recorded person interacted with while performing a specified activity during a specified period within a video input 202, the query answer 208 can include the object prediction 338. When the relational space-time query 204 represents a time query, the time prediction 340 can be used to form the query answer 208. For example, if the relational space-time query 204 asks when the recorded person performed a specified activity with a specified object within a video input 202, the query answer 208 can include the time prediction 340. When the relational space-time query 204 represents an inverted search, the query answer 208 can include a "yes," "no," or other suitable answer based on the predictions 336, 338, 340. For instance, if the relational space-time query 204 asks whether a recorded person performed a specified activity with a specified object during a specified period within a video input 202, the query answer 208 can include "yes" if the activity prediction 336, object prediction 338, and time prediction 340 all match the criteria specified in the relational space-time query 204.

As noted above, a video input 202 may be relatively long, in which case the video input 202 may capture a number of different activities and/or a number of different objects while being recorded over a relatively long period of time. In some cases, it may be possible to process the entire video input 202 as a whole, such as when the electronic device 101 or other platform implementing the pipeline 300 has adequate processing, memory, or other resources. In other embodiments, a pre-processing function 342 and a post-processing function 344 may be used in the architecture 300, where the pre-processing function 342 splits the video input 202 into multiple segments and the post-processing function 344 combines the predictions generated by the operation 206 using the segments. For example, the pre-processing function 342 can divide a video input 202 into multiple segments or clips, and each segment can be provided to the operation 206 for use in generating one or more of the predictions 336, 338, 340. The pre-processing function 342 may divide the video input 202 into any desired number of segments, such as by dividing the video input 202 into segments of roughly equal duration or by dividing the video input 202 into separate scenes.

The post-processing function 344 combines or aggregates the various predictions 336, 338, 340 across the segments of the video input 202 into at least one final prediction that is used to form or otherwise generate a query answer 208. The post-processing function 344 can use any suitable technique(s) to aggregate predictions for multiple segments of the video input 202. In some cases, the specific technique used to aggregate predictions depends on the type of relational space-time query 204 being processed. For example, when the relational space-time query 204 represents an activity query, the activity predictions 336 across all segments can be combined into a vector in order to generate a final activity prediction for the video input 202. When the relational space-time query 204 represents an object query, the object predictions 338 across all segments can be combined into a list that includes the predictions for separate image frames 302, and the list can be used as a final object prediction for the video input 202.

When the relational space-time query 204 represents a time query, the time predictions 340 can include a start time and an end time of at least one portion of at least one segment that satisfies the time query. If the end time for one prediction matches or is close to the start time for the next consecutive prediction (such as within a specified time), those two predictions can be merged into a single start time and a single end time across the multiple predictions. In other words, the predictions can be stitched or merged together into a single prediction, and the single prediction can be used as a final time prediction for the video input 202. If there are non-mergeable predictions (such as when there are distinctly different time periods predicted as satisfying the time query), the prediction covering the largest time period may be used as a final time prediction for the video input 202. Note that this can also be done at the segment level, meaning the time predictions 340 may identify segments (rather than portions of segments) that satisfy the time query, and consecutive segments that satisfy the time query may be merged into a single time prediction 340.

When the relational space-time query 204 represents an inverted search, all of these post-processing steps may be performed. For instance, the post-processing function 344 may combine activity predictions 336 across all segments to produce a final object prediction for the video input 202, combine object predictions 338 across all segments to produce a final object prediction for the video input 202, and identify and possibly stitch time predictions 340 across all segments to produce a final time prediction for the video input 202. The three final predictions may be used to determine whether all criteria in the relational space-time query 204 are satisfied, in which case the query answer 208 can include "yes." If not, the query answer 208 can include "no."

As described above, in some cases, when the architecture 300 is being used to answer a specific relational space-time query 204, at least one input to the architecture 300 may be masked out or otherwise not used. For example, with an activity query, the activity 304 may be masked out, and only the activity prediction 336 may be needed to generate the query answer 208. With an object query, the object 306 may be masked out, and only the object prediction 338 may be needed to generate the query answer 208. In both of these cases, it is possible that only a subset of the image frames 302 of a video input 202 are used, such as when the relational space-time query 204 includes an identifiable time period. With a time query, all or a subset of the image frames 302 of a video input 202 may be used, and only the time prediction 340 may be needed to generate the query answer 208.

The one or more machine learning models used to implement at least part of the multitask video retrieval with cross-attention operation 206 can be trained in any suitable manner. For example, training data can be provided to the multitask video retrieval with cross-attention operation 206, and predictions 336, 338, 340 that are generated using the training data can be compared to ground truths representing expected or correct predictions. Differences between the actual and expected predictions can be used to calculate a loss, and weights or other parameters of the machine learning model(s) can be adjusted if the loss is excessive (such as when the loss exceeds a specified threshold). The modified machine learning model(s) can be used to process the same or other training data so that additional predictions can be generated and compared to ground truths in order to update the calculated loss. If necessary, the weights or other parameters of the machine learning model(s) can be adjusted again if the loss is still excessive. This process can occur iteratively, and the loss ideally decreases over time until the multitask video retrieval with cross-attention operation 206 generates accurate predictions 336, 338, 340 (at least to within some desired level of accuracy as defined by the threshold).

Note that the one or more machine learning models implementing the cross-attention functions 324, 326, 328 can be trained end-to-end such that, given each training query, all three predictions 336, 338, 340 (activity, object, and time) can be generated. However, the loss may be computed on the specific ground truth(s) relevant to each given query. Thus, for instance, the loss may be computed based only on the predicted and ground-truth activities for an activity query and not based on the object and time predictions generated for the activity query. Similar actions may occur for object and time queries. For inverted search queries, all three predictions may be used when calculating the loss. Also note that if a single machine learning model is used for the cross-attention functions 324, 326, 328, this offers the potential for the cross-transfer of knowledge among the tasks, which may improve video retrieval performance.

Although FIGS. 2 and 3 illustrate examples of architectures 200 and 300 supporting end-to-end multitask video retrieval with cross-attention, various changes may be made to FIGS. 2 and 3. For example, various components or functions in each of FIGS. 2 and 3 may be combined, further subdivided, replicated, omitted, or rearranged and additional components or functions may be added according to particular needs.

As noted above, the ability to process video inputs 202 in order to generate query answers 208 for relational space-time queries 204 can be used in a number of practical applications. The following now presents examples of such practical applications in which the described techniques may be used. However, the following discussion is for illustration and explanation only. The described techniques may be used in any other suitable manner and in any other suitable applications or use cases without departing from the scope of this disclosure.

As a first example use case, the described techniques may be used to add search capabilities inside videos to support video retrieval. For example, smart cameras, action cameras, and virtual reality/augmented reality/mixed reality assistants can record huge numbers of videos but do not provide relational space-time search capabilities. The described techniques can be used to allow users to search within these videos in order to identify useful or other information.

As a second example use case, the described techniques may be used to support specific types of inverted search queries for videos. For instance, the described techniques may be used by a user to search through videos associated with that user and determine answers to certain queries, which can allow the user to determine whether the videos indicate the user performed a particular activity with a particular object during a particular time period. This type of inverted searching can have various applications, such as in medication reminder and action checklist applications. For a medication reminder application (such as for children or older adults), the medication reminder application can be used to remind someone to consume (activity) medication (object) at one or more times of day (time). Thus, videos of the user's actions over time can be examined using the described techniques to determine if it appears the user completed this task, and a reminder can be provided to the user if not. For an action checklist application, the action checklist application can monitor actions performed by a user, such as complicated operations performed by a professional. For instance, pilots and other flight personnel often need to work through checklists before flight takeoff, and doctors and other medical personnel often need to work through checklists before performing complex operations.

By supporting inverted searching, the described techniques can be used to monitor a user's actions and verify whether all actions identified in a checklist have been performed correctly with the correct objects and in the correct sequence by the user.

As a third example use case, the described techniques may be used to support anomalous activity detection, such as with smart home devices or home-buddy robots. For example, the described techniques can be used to detect certain activities performed on objects during particular times of time. If a subsequent activity is not expected or is unusual, the subsequent activity can be treated as being anomalous. As a particular example, opening a window may be common during the day but not at night. If someone opens the window at night, this can be identified as an anomalous event for a particular home or other environment, and a notification can be initiated or other action(s) can occur.

FIGS. 4 and 5 illustrate specific examples of use cases 400 and 500 for end-to-end multitask video retrieval with cross-attention in accordance with this disclosure. As shown in FIG. 4, the use case 400 involves an offline model training operation 402 that can train one or more machine learning models used to implement at least part of the multitask video retrieval with cross-attention operation 206. Once trained, a deployment operation 404 can be used to provide the one or more trained machine learning models to one or more end user devices 406. In this example, an end user device 406 represents a television.

The end user device 406 can include at least one camera 408 used to capture videos of the scene around the end user device 406. A user 410 can submit relational space-time queries 412 to the end user device 406, such as via an on-screen display of the end user device 406 or via another device (such as the user's smartphone) that can communicate with the end user device 406. The end user device 406 can analyze the videos captured using the camera(s) 408 in order to generate responses to the queries 412 for the user 410. Depending on the implementation, the responses may be presented on or by the end user device 406 itself, communicated to another device (such as the user's smartphone), or presented in any other suitable manner.

Note that some end user devices 406 like televisions may have limited memory for storing things like machine learning models. Thus, some embodiments may perform quantization of the one or more machine learning models prior to deployment. Also note that the one or more machine learning models here could be deployed to and used by the end user device 406 without requiring the end user device 406 to transmit queries or other information back to a server or other external destination. This can be desirable since video content recorded by the end user device 406 can be private to the user, such as when the end user device 406 is located in the user's home.

In other cases, this may not be a concern, such as when the videos being analyzed are not captured in the user's home. As shown in FIG. 5, for example, the use case 500 involves deploying the one or more trained machine learning models to a cloud instance 502, which represents or includes an application that can be executed in a cloud computing environment or other network that is remote from the user 410.

In this example, the end user device 406 can receive relational space-time queries 412 from the user 410 and forward the queries 412 to the cloud instance 502. For each query 412, the cloud instance 502 can use the query 412 to search a database 504 of recorded content, which may represent any suitable collection of videos to be searched. As particular examples, the database 504 may include recorded television content, such as sports programs or other television programs. Here, the user 410 may be interested in searching within one or more television programs, such as when the user is interested in searching a soccer match to identify when (time) a player made a long pass (activity) with a ball (object). The cloud instance 502 can generate a query answer 506 for each query 412 and provide the query answer 506 back to the end user device 406. Depending on the implementation, the query answer 506 may be presented on or by the end user device 406 itself communicated to another device (such as the user's smartphone), or presented in any other suitable manner.

This type of implementation can store the recorded video content remotely, meaning not on the end user device 406 itself. This may be necessary or desirable since the amount of television content is huge, and it is generally not possible to store all of the possible television content to be searched on the end user device 406 itself. However, some television content could be stored on the end user device 406 itself and searched locally.

Although FIGS. 4 and 5 illustrate specific examples of use cases 400, 500 for end-to-end multitask video retrieval with cross-attention, various changes may be made to FIGS. 4 and 5. For example, the use cases 400, 500 shown here are examples only, and the techniques described in this patent document may be used in any other suitable manner.

Figure 6:
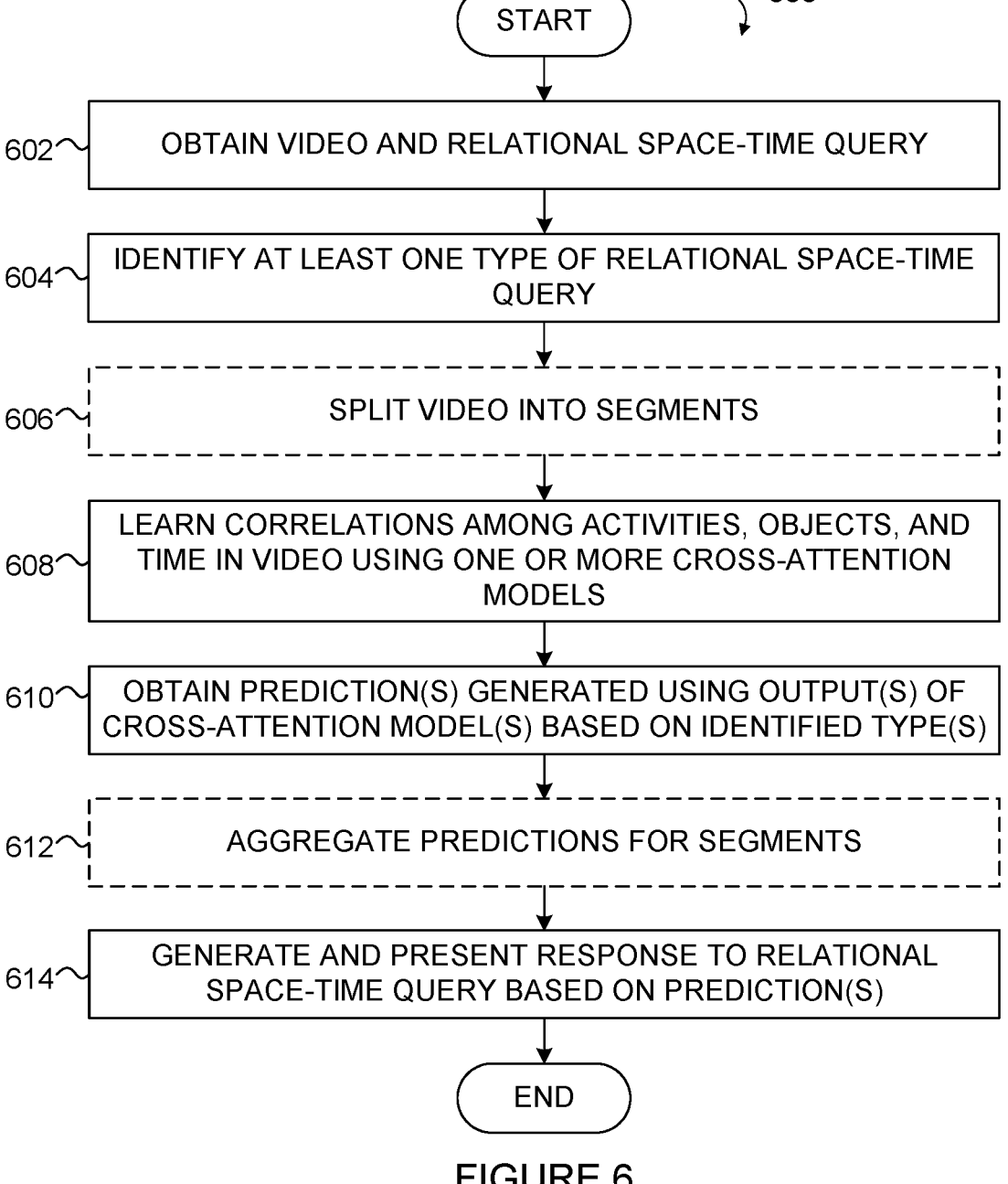
FIG. 6 illustrates an example method for end-to-end multitask video retrieval with cross-attention in accordance with this disclosure.

FIG. 6 illustrates an example method 600 for end-to-end multitask video retrieval with cross-attention in accordance with this disclosure. For ease of explanation, the method 600 shown in FIG. 6 is described as being performed by the electronic device 101 in the network configuration 100 of FIG. 1, where the electronic device 101 can use the architecture 200 or 300 shown in FIG. 2 or 3. However, the method 600 shown in FIG. 6 could be performed using any other suitable device(s) and architecture(s) and in any other suitable system(s).

As shown in FIG. 6, a video and a relational space-time query are obtained at step 602. This may include, for example, the processor 120 of the electronic device 101 receiving a video input 202 from any suitable source and receiving a relational space-time query 204 from a user or other source. At least one type of the relational space-time query is identified at step 604. This may include, for example, the processor 120 of the electronic device 101 determining whether the relational space-time query 204 is of an activity type, an object type, a time type, or a combination thereof (such as for an inverted search). The video may optionally be split into segments at step 606. This may include, for example, the processor 120 of the electronic device 101 dividing the video input 202 into shorter segments, such as into separate image frames 302 or separate collections of image frames 302.

Correlations among activities, objects, and time in the video are learning using one or more cross-attention models at step 608, and one or more predictions generated using the output(s) of the cross-attention model(s) can be obtained at step 610. This may include, for example, the processor 120 of the electronic device 101 generating embeddings of at least some of the image frames 302 of the video input 202 and generating embeddings of at least one of an activity 304 or an object 306 associated with the relational space-time query 204. This may also include the processor 120 of the electronic device 101 identifying one or more tokens for each of the at least some image frames 302 in the video input 202 and for at least one of the activity 304 or the object 306 associated with the relational space-time query 204 based on the embeddings. This may further include processor 120 of the electronic device 101 performing activity cross-attention, object cross-attention, and/or time cross-attention based on the tokens and processing results of cross-attention(s) to generate an activity prediction 336, an object prediction 338, and/or a time prediction 340. Note that the specific type(s) of prediction(s) obtained here can vary depending on the type(s) associated with the relational space-time query 204. In some embodiments, the one or more cross-attention models used here may represent a single cross-attention model.

If the video is segmented, one or more predictions can be generated for each segment, and the predictions for the segments are aggregated at step 612. This may include, for example, the processor 120 of the electronic device 101 combining activity predictions 336 for the multiple segments into a vector in order to generate a final activity prediction for the video input 202. This may also or alternatively include the processor 120 of the electronic device 101 generating a list including object predictions 338 for the multiple segments in order to generate a final object prediction for the video input 202. This may also or alternatively include the processor 120 of the electronic device 101 stitching at least two time predictions 340 together based on their start and/or end times in order to generate a final time prediction for the video input 202.

A response to the relational space-time query is generated based on the prediction(s) and presented to a user at step 614. This may include, for example, the processor 120 of the electronic device 101 using an activity prediction 336 to generate a query answer 208 to an activity query, using an object prediction 338 to generate a query answer 208 to an object query, or using a tine prediction 340 to generate a query answer 208 to a time query. This may alternatively include the processor 120 of the electronic device 101 using an activity prediction 336, an object prediction 338, and a time prediction 340 to generate a query answer 208 to an inverted search query. Note, however, that the prediction(s) may be used in any other suitable manner to generate a query answer 208 to the relational space-time query 204.

Although FIG. 6 illustrates one example of a method 600 for end-to-end multitask video retrieval with cross-attention, various changes may be made to FIG. 6. For example, while shown as a series of steps, various steps in FIG. 6 may overlap, occur in parallel, occur in a different order, or occur any number of times (including zero times).

It should be rioted that the functions shown in or described with respect to FIGS. 2 through 6 can be implemented in an electronic device 101, server 106, or other device(s) in any suitable manner. For example, in some embodiments, at least some of the functions shown in or described with respect to FIGS. 2 through 6 can be implemented or supported using one or more software applications or other software instructions that are executed by the processor 120 of the electronic device 101, server 106, or other device(s). In other embodiments, at least some of the functions shown in or described with respect to FIGS. 2 through 6 can be implemented or supported using dedicated hardware components. In general, the functions shown in or described with respect to FIGS. 2 through 6 can be performed using any suitable hardware or any suitable combination of hardware and software/firmware instructions. Also, the functions shown in or described with respect to FIGS. 2 through 6 can be performed by a single device or by multiple devices.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

obtaining, at an electronic device, a video and a relational space-time query;

identifying, at the electronic device, at least one type of the relational space-time query, the at least one type of the relational space-time query representing an object type;

learning, at the electronic device, correlations among activities, objects, and time in the video using one or more cross-attention models;

obtaining, at the electronic device, one or more predictions generated using one or more outputs of the one or more cross-attention models based on the at least one type of the relational space-time query;

generating, at the electronic device, a response to the relational space-time query based on the one or more predictions;

splitting the video into multiple segments, wherein the one or more predictions are generated using the one or more outputs of the one or more cross-attention models for each of the multiple segments and splitting the video into the multiple segments comprises splitting the video into separate image frames; and generating a list including the predictions for the multiple segments in order to generate an object prediction for the video.

2. The method of claim 1, wherein:

the at least one type of the relational space-time query further representing an activity type; and the method further comprises combining the predictions for the multiple segments into a vector in order to generate an activity prediction for the video.

3. The method of claim 1, wherein:

the at least one type of the relational space-time further representing a time type;

each prediction is associated with a start time and an end time; and the method further comprises stitching at least two of the predictions together based on at least some of their start and end times in order to generate a time prediction for the video.

4. The method of claim 1, wherein learning the correlations among the activities, objects, and time in the video comprises:

generating embeddings of at least some image frames in the video and embeddings of at least one of an activity or an object identified by the relational space-time query;

identifying one or more tokens for each of the at least some image frames in the video and for at least one of the activity or the object identified by the relational space-time query based on the embeddings;

performing at least one of activity cross-attention, object cross-attention, or time cross-attention based on the tokens; and processing results of at least one of the activity cross-attention, object cross-attention, or time cross-attention in order to generate at least one of an activity prediction, an object prediction, or a time prediction.

5. The method of claim 1, wherein the one or more cross-attention models represent a single cross-attention model.

6. An electronic device comprising:

at least one processing device configured to:

obtain a video and a relational space-time query;

identify at least one type of the relational space-time query, the at least one type of the relational space-time query representing an object type;

learn correlations among activities, objects, and time in the video using one or more cross-attention models;

obtain one or more predictions generated using one or more outputs of the one or more cross-attention models based on the at least one type of the relational space-time query;

generate a response to the relational space-time query based on the one or more predictions;

split the video into multiple segments, wherein the one or more predictions are generated using the one or more outputs of the one or more cross-attention models for each of the multiple segments and splitting the video into the multiple segments comprises splitting the video into separate image frames; and generate a list including the predictions for the multiple segments in order to generate an object prediction for the video.

7. The electronic device of claim 6, wherein:

the at least one type of the relational space-time query further representing an activity type; and the at least one processing device is further configured to combine the predictions for the multiple segments into a vector in order to generate an activity prediction for the video.

8. The electronic device of claim 6, wherein:

the at least one type of the relational space-time query further representing a time type;

each prediction is associated with a start time and an end time; and the at least one processing device is further configured to stitch at least two of the predictions together based on at least some of their start and end times in order to generate a time prediction for the video.

9. The electronic device of claim 6, wherein, to learn the correlations among the activities, objects, and time in the video, the at least one processing device is configured to:

generate embeddings of at least some image frames in the video and embeddings of at least one of an activity or an object identified by the relational space-time query;

identify one or more tokens for each of the at least some image frames in the video and for at least one of the activity or the object identified by the relational space-time query based on the embeddings;

perform at least one of activity cross-attention, object cross-attention, or time cross- attention based on the tokens; and process results of at least one of the activity cross-attention, object cross-attention, or time cross-attention in order to generate at least one of an activity prediction, an object prediction, or a time prediction.

10. The electronic device of claim 6, wherein the one or more cross-attention models represent a single cross-attention model.

11. A non-transitory machine readable medium containing instructions that when executed cause at least one processor of an electronic device to:

obtain a video and a relational space-time query;

identify at least one type of the relational space-time query, the at least one type of the relational space-time query representing an object type;

learn correlations among activities, objects, and time in the video using one or more cross-attention models;

obtain one or more predictions generated using one or more outputs of the one or more cross-attention models based on the at least one type of the relational space-time query;

generate a response to the relational space-time query based on the one or more predictions;

split the video into multiple segments, wherein the one or more predictions are generated using the one or more outputs of the one or more cross-attention models for each of the multiple segments and splitting the video into the multiple segments comprises splitting the video into separate image frames; and generate a list including the predictions for the multiple segments in order to generate an object prediction for the video.

12. The non-transitory machine readable medium of claim 11, wherein:

the at least one type of the relational space-time query further representing an activity type; and the non-transitory machine readable medium further contains instructions that when executed cause the at least one processor to combine the predictions for the multiple segments into a vector in order to generate an activity prediction for the video.

13. The non-transitory machine readable medium of claim 11, wherein:

the at least one type of the relational space-time query further representing a time type;

each prediction is associated with a start time and an end time; and the non-transitory machine readable medium further contains instructions that when executed cause the at least one processor to stitch at least two of the predictions together based on at least some of their start and end times in order to generate a time prediction for the video.

14. The non-transitory machine readable medium of claim 11, wherein the instructions that when executed cause the at least one processor to learn the correlations among the activities, objects, and time in the video comprise:

instructions that when executed cause the at least one processor to:

generate embeddings of at least some image frames in the video and embeddings of at least one of an activity or an object identified by the relational space-time query;

identify one or more tokens for each of the at least some image frames in the video and for at least one of the activity or the object identified by the relational space-time query based on the embeddings;

perform at least one of activity cross-attention, object cross-attention, or time cross-attention based on the tokens; and process results of at least one of the activity cross-attention, object cross- attention, or time cross-attention in order to generate at least one of an activity prediction, an object prediction, or a time prediction.

\* \* \* \* \*